US011088655B2

(12) United States Patent
Zhuang et al.

(10) Patent No.: US 11,088,655 B2
(45) Date of Patent: Aug. 10, 2021

(54) PHOTOVOLTAIC SOLID-STATE TRANSFORMER, PHOTOVOLTAIC INVERTER SYSTEM AND BIDIRECTIONAL HIGH-VOLTAGE CONVERTER

(71) Applicant: SUNGROW POWER SUPPLY CO., LTD., Anhui (CN)

(72) Inventors: Jiacai Zhuang, Anhui (CN); Yilei Gu, Anhui (CN); Jun Xu, Anhui (CN); Xinyu Wang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 266 days.

(21) Appl. No.: 16/239,256

(22) Filed: Jan. 3, 2019

(65) Prior Publication Data
US 2019/0238088 A1 Aug. 1, 2019

(30) Foreign Application Priority Data

Jan. 31, 2018 (CN) .......................... 201810094860.4

(51) Int. Cl.
*H02S 40/32* (2014.01)
*H02J 3/38* (2006.01)
(Continued)

(52) U.S. Cl.
CPC ................ *H02S 40/32* (2014.12); *H02J 3/01* (2013.01); *H02J 3/385* (2013.01);
(Continued)

(58) Field of Classification Search
CPC ..... H02S 40/32; H02M 7/797; H02M 7/4807; H02M 3/33561; H02M 7/49;
(Continued)

(56) References Cited

U.S. PATENT DOCUMENTS 6,369,462 B1 * 4/2002 Sih .......................... H02J 3/383
307/51
7,088,594 B2 * 8/2006 Sase .................. H02M 3/33592
363/16
(Continued)

FOREIGN PATENT DOCUMENTS

| CN | 101950969 A | | 1/2011 |
| CN | 103178742 A | * | 6/2013 |

(Continued)

OTHER PUBLICATIONS

IEEE Journal of Photovoltaics, vol. 4, No. 3, May 2014 Titled A Multilevel Medium-Voltage Inverter for Step-Up-Transformer-Less Grid Connection of Photovoltaic Power Plants by Md. Rabiul Islam, Youguang Guo, and Jianguo Zhu ("IEEE Journal"). (Year: 2014).*

(Continued)

*Primary Examiner* — Jared Fureman
*Assistant Examiner* — Michael J Warmflash
(74) *Attorney, Agent, or Firm* — Harness, Dickey & Pierce, P.L.C.

(57) ABSTRACT

A photovoltaic solid-state transformer, a photovoltaic inverter system and a bidirectional high-voltage transformer are provided. The photovoltaic solid-state transformer includes: multiple single phase modules and a filter. Each of the single phase modules includes multiple multiple-output isolated DC/DC converters and multiple cascade DC/AC modules, where each of the multiple-output isolated DC/DC converters includes a DC/AC module, a high frequency transformer and multiple AC/DC modules. The multiple single phase modules are connected to the grid via the filter in a star connection or a delta connection. The DC/DC converters and the cascade DC/AC modules are simple logical switches and have conversion efficiency higher than 99%, such that the photovoltaic solid-state transformer has (Continued)

a reduced volume, and an improved overall efficiency higher than 98.5%.

11 Claims, 8 Drawing Sheets

(51) Int. Cl.
    *H02J 3/01* (2006.01)
    *H02M 7/797* (2006.01)
    *H02M 7/48* (2007.01)
    *H02M 3/335* (2006.01)
    *H02M 7/49* (2007.01)
    *H02M 1/00* (2006.01)
    *H02M 3/24* (2006.01)

(52) U.S. Cl.
    CPC ..... *H02M 3/33561* (2013.01); *H02M 7/4807* (2013.01); *H02M 7/49* (2013.01); *H02M 7/797* (2013.01); *H02M 3/24* (2013.01); *H02M 2001/007* (2013.01); *H02M 2001/008* (2013.01); *H02M 2001/0077* (2013.01); *Y02E 10/56* (2013.01)

(58) Field of Classification Search
    CPC ... H02M 2001/0077; H02M 2001/007; H02M 2001/008; H02M 3/24; H02M 3/28; H02J 3/01; H02J 3/385; H02J 3/381; H02J 2300/26; Y02E 10/56
    See application file for complete search history.

(56) References Cited

U.S. PATENT DOCUMENTS

| | | | | |
|---|---|---|---|---|
| 9,722,508 B2* | 8/2017 | Ayai | ........................ | H02M 7/44 |
| 10,116,229 B1* | 10/2018 | Alshammaa | ............ | H02M 7/49 |
| 10,205,403 B2 | 2/2019 | Xu et al. | | |
| 2005/0099827 A1* | 5/2005 | Sase | .................. | H02M 3/33569 |
| | | | | 363/16 |
| 2010/0141041 A1* | 6/2010 | Bose | ........................ | H02M 7/49 |
| | | | | 307/82 |
| 2015/0016159 A1* | 1/2015 | Deboy | .................... | H02J 3/381 |
| | | | | 363/71 |
| 2016/0329829 A1* | 11/2016 | Ayai | ........................ | H02M 7/44 |
| 2017/0264099 A1 | 9/2017 | Zhang et al. | | |
| 2017/0310239 A1 | 10/2017 | Xu et al. | | |
| 2019/0305552 A1* | 10/2019 | Cao | ........................ | H02S 40/36 |

FOREIGN PATENT DOCUMENTS

| | | |
|---|---|---|
| CN | 103490448 A | 1/2014 |
| CN | 107104461 A | 8/2017 |
| CN | 107134926 A | 9/2017 |
| CN | 107612405 A | 1/2018 |
| EP | 3109992 A1 | 12/2016 |
| JP | 2005151608 A | 6/2005 |
| JP | 2010178521 A | 8/2010 |
| JP | 2015076050 A | 4/2015 |
| JP | 2017011964 A | 1/2017 |
| JP | 2017055589 A | 3/2017 |
| JP | 2017527001 A | 9/2017 |
| JP | 2017200427 A | 11/2017 |
| WO | WO-2015105081 A1 | 7/2015 |

OTHER PUBLICATIONS

First Chinese Office Action regarding Chinese Application No. 201810094860.4 dated Jun. 11, 2019.
Second Chinese Office Action regarding Application No. 201810094860.4 dated Mar. 19, 2020. English translation provided by Unitalen Attorneys at Law.
Extended European Search Report regarding European Application No. 19153276.1 dated Aug. 2, 2019.
Islam, Md. Rabiul et al., "A Multilevel Medium-Voltage Inverter for Step-Up-Transformer-Less Grid Connection of Photovoltaic Power Plants", IEEE Journal of Photovoltaics; vol. 4, No. 3; May 2014; pp. 881-889.
First Japanese Office Action regarding Application No. 2019-008998 dated Dec. 23, 2019. English translation provided by Unitalen Attorneys at Law.
Second Japanese Office Action regarding Application No. 2019-008998 dated Jun. 8, 2020. English translation provided by Unitalen Attorneys at Law.

* cited by examiner

PHOTOVOLTAIC SOLID-STATE TRANSFORMER, PHOTOVOLTAIC INVERTER SYSTEM AND BIDIRECTIONAL HIGH-VOLTAGE CONVERTER

The present application claims priority to Chinese Patent Application No. 201810094860.4, titled "PHOTOVOLTAIC SOLID-STATE TRANSFORMER, PHOTOVOLTAIC INVERTER SYSTEM AND BIDIRECTIONAL HIGH-VOLTAGE CONVERTER", filed on Jan. 31, 2018 with the Chinese Patent Office, which is incorporated herein by reference in its entirety.

FIELD

The present disclosure relates to the technical field of new energy power generation, and in particular to a photovoltaic solid-state transformer, a photovoltaic inverter system and a bidirectional high-voltage converter.

BACKGROUND

Generally, in a conventional photovoltaic power generation inverter system, photovoltaic modules are connected in series until an output voltage of 1000V or 1500V is obtained, and then are connected to a string inverter or a central inverter. The inverter outputs an alternative current voltage of several hundred volts (such as three-phase 315V, 360V, 400V, 550V, etc.) and is connected to a power transformer. The power transformer which outputs a voltage of 10 KV, 22 KV, 35 KV, or 110 KV is connected to a grid.

In an actual photovoltaic power generation station, the inverters and the power transformer are usually purchased from different manufacturers, and are connected to each other via cables since they are arranged at certain distances. The use of the cable not only brings risks of connector failure caused by non-standard operation and quality problems of cable connectors, but also brings a certain power loss and an increased cost.

A development trend of the current photovoltaic power generation inverter system is to integrate the inverter with the power transformer. However, the power transformer operates at a power frequency, is formed by a large amount of material such as copper and iron and has a large volume. In addition, the power transformer has disadvantages of high no-load loss, direct current bias, harmonic generation when the iron core is saturated, excitation of inrush current when connected to the grid, primary and secondary harmonics and propagated and correlated faults.

In other cases, a structure in which a solid-state transformer instead of an inverter is integrated with the power transformer is adopted. The solid-state transformer is constituted by power semiconductors, inductors and capacitors, and includes three stages of conversion including alternative current-direct current (AC/DC) conversion, isolated direct current-direct current (DC/DC) conversion and direct current-alternative current (DC/AC) conversion. This structure has a low efficiency (assuming that the efficiency of each stage is 99%, the overall efficiency of the three stages is less than 97%).

In view of this, it is a technical issue to be solved by those skilled in the art to provide a photovoltaic solid-state transformer having an increased overall efficiency and a reduced system volume.

SUMMARY

In view of this, a photovoltaic solid-state transformer is provided according to embodiments of the present disclosure, in which DC/DC converters and cascade DC/AC modules are adopted to reduce the volume. In addition, the efficiency of the DC/DC converter is higher than 99%, and the efficiency of the cascade DC/AC module is higher than 99.5%, such that the solid-state transformer has an improved overall efficiency higher than 98.5%.

In order to achieve the above objects, the following technical solutions are provided according to the present disclosure.

A photovoltaic solid-state transformer is provided, which includes multiple single phase modules and a filter.

Each of the single phase modules includes multiple multiple-output isolated DC/DC converters and multiple cascade DC/AC modules. Each of the multiple-output isolated DC/DC converters includes a DC/AC module, a high frequency transformer and multiple AC/DC modules. An input terminal of each of the cascade DC/AC modules is connected to an output terminal of at least one of the AC/DC modules. Output terminals of the multiple cascade DC/AC modules are cascaded, to form a first output terminal and a second output terminal of the single phase module.

The first output terminal of each of the single phase modules is connected to an input terminal of the filter, and second output terminals of the single phase modules are connected to each other, or are connected to an output terminal of the filter.

In an embodiment, the high frequency transformer is configured to isolate a voltage greater or equal to 10 KV.

In an embodiment, the filter is one of an L-filter, an LC-filter, an LCL-filter or a high-order filter.

In an embodiment, the DC/AC module is one of a full-bridge DC/DC converter, a half-bridge DC/DC converter, an LC resonant DC/DC converter, an LLC resonant DC/DC converter and a dual-active DC/DC converter.

In an embodiment, each of the AC/DC modules is one of a full-bridge rectifying AC/DC module, a full bridge rectifying and filtering AC/DC module, a dual-active AC/DC module and a C-LLC AC/DC module.

In an embodiment, each of the cascade DC/AC modules is one of an H-bridge DC/AC module and a cascade DC/AC module connected with a filter.

In an embodiment, the photovoltaic solid-state transformer further includes a controller, a communication module and a power supply.

The controller is connected to the cascade DC/AC modules and is configured to control the cascade DC/AC modules to cascade signals outputted by the cascade DC/AC modules;

The communication module is connected to the controller and is configured to transmit an output signal of the controller to a preset background server.

The power supply is connected to the controller and is configured to supply power to the photovoltaic solid-state transformer.

In an embodiment, input terminals of a part of the DC/AC modules in the multiple-output isolated DC/DC converters are connected to an external battery or an external photovoltaic module.

In an embodiment, the photovoltaic solid-state transformer further includes an MPPT (maximum power point tracking) module connected to an input terminal of the photovoltaic solid-state transformer.

A photovoltaic inverter system is provided, which includes the photovoltaic solid-state transformer according to any one of the above embodiments and at least one branch including a photovoltaic string and an MPPT (maximum power point tracking) module connected in series.

The photovoltaic string includes multiple photovoltaic assemblies, and a direct current input terminal of the photovoltaic solid-state transformer is connected to at least two MPPT modules connected in parallel.

A bidirectional high-voltage converter is provided, which includes multiple single phase modules and a filter.

Each of the single phase modules includes multiple multiple-port bidirectional isolated DC/DC converters and multiple cascade bidirectional DC/AC modules. Each of the multiple-port bidirectional isolated DC/DC converters includes a bidirectional DC/AC module, a high frequency transformer and bidirectional AC/DC modules. A direct current terminal of each of the cascade bidirectional DC/AC modules is connected to a direct current terminal of at least one of the bidirectional AC/DC modules. Alternative current terminals of the cascade bidirectional DC/AC modules are cascaded, to form a first alternative current terminal and a second alternative current terminal of the single phase module.

The first alternative current terminal of each of single phase modules is connected to one terminal of the filter, and second alternative current terminals of the single phase modules are connected to each other, or are connected to another terminal of the filter.

Based on the technical solutions described above, a photovoltaic solid-state transformer is provided, which includes: multiple single phase modules and a filter. Each of the single phase modules includes multiple multiple-output isolated DC/DC converters and multiple cascade DC/AC modules, where each of the multiple-output isolated DC/DC converters includes a DC/AC module, a high frequency transformer and multiple AC/DC modules, an input terminal of each of the cascade DC/AC modules is connected to an output terminal of at least one of the AC/DC modules, and output terminals of the multiple cascade DC/AC modules are cascaded, to form a first output terminal and a second output terminal of the single phase module. The first output terminal of each of the single phase modules is connected to an input terminal of the filter, and second output terminals of the single phase modules are connected to each other, or are connected to an output terminal of the filter. As can be seen, in the photovoltaic solid-state transformer provided according to the embodiments of the present disclosure, the DC/DC converters and the cascade DC/AC modules are adopted, both of which are simple logical switches such that the volume of the photovoltaic solid-state transformer is reduced. In addition, since the efficiency of the DC/DC converter is higher than 99%, the efficiency of the cascade DC/AC module is higher than 99.5%, the photovoltaic solid-state transformer has an improved overall efficiency higher than 98.5%.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

As described in the background, a device, where an inverter and a power transformer are integrated has a large volume and has disadvantages of high no-load loss, direct current bias, harmonic generation when the iron core is saturated, excitation of inrush current when connected to the grid, primary and secondary harmonics and propagated and correlated faults. Therefore, a solid-state transformer is developed rapidly.

Figure 1:
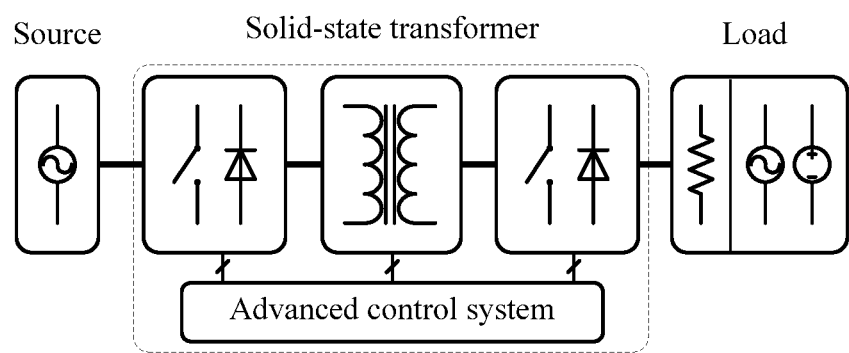
FIG. 1 is a schematic structural diagram of a solid-state transformer according to the conventional technology.

Generally, as shown in FIG. 1, the solid-state transformer includes three stages of conversion, including AC/DC conversion, isolated DC/DC conversion and DC/AC conversion, with the energy efficiency of each level being about 99%, and the overall energy efficiency of the solid-state transformer combining the three stages being about 97%. As can be seen, the energy efficiency of the solid-state transformer is low. Therefore, the inventor combines the inverters in the photovoltaic inverter system and the solid-state transformer to improve the overall energy efficiency of the solid-state transformer.

Figure 2:
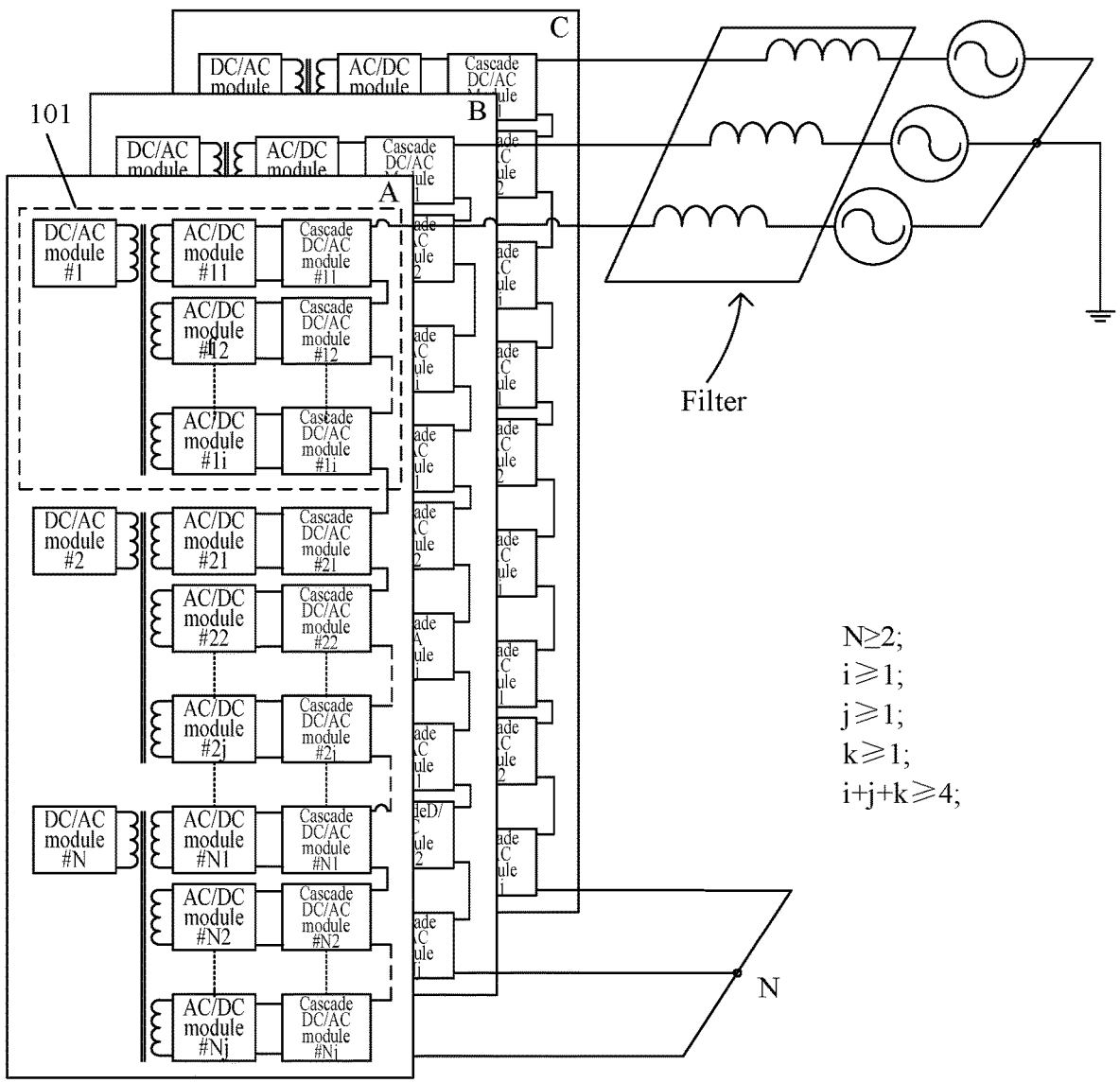
FIG. 2 is a schematic structural diagram of a photovoltaic solid-state transformer according to an embodiment of the present disclosure.

Reference is made to FIG. 2, which is a schematic structural diagram of a photovoltaic solid-state transformer according to an embodiment of the present disclosure. The photovoltaic solid-state transformer includes: multiple single phase modules (shown as A, B and C in FIG. 2) and a filter. Each of the single phase modules includes multiple multiple-output isolated DC/DC converters and multiple cascade DC/AC modules. Each of the multiple-output isolated DC/DC converters includes a DC/AC module, a high frequency transformer and multiple AC/DC modules.

Each of the multiple-output isolated DC/DC converters and the multiple cascade DC/AC modules are as shown in a module 101 in FIG. 2. An input terminal of each of the cascade DC/AC modules is connected to an output terminal of at least one of the AC/DC modules. Output terminals of the multiple cascade DC/AC modules are cascaded to form a first output terminal and a second output terminal of the module 101. Multiple modules 101 are cascaded to form a single phase module. The first output terminal of the single phase module is connected to an input terminal of the filter. Second output terminals of multiple single phase modules are connected to each other, or are connected to an output terminal of the filter.

As can be seen, in the photovoltaic solid-state transformer provided according to the embodiments of the present disclosure, the DC/DC converters and the cascade DC/AC modules are adopted, both of which are simple logical switches such that the volume of the photovoltaic solid-state transformer is reduced. In addition, since the efficiency of the DC/DC converter is higher than 99%, the efficiency of the cascade DC/AC module is higher than 99.5%, the photovoltaic solid-state transformer has an improved overall efficiency higher than 98.5%.

Specifically, as shown in FIG. 2, three single phase modules and inverters are connected to the grid in a star connection. Each of the single phase modules has the first output terminal and the second output terminal. The first output terminal is an output terminal of a first cascade DC/AC module, a second output terminal of the first cascade DC/AC module is connected to a first output terminal of a next cascade DC/AC module. After all the cascade DC/AC modules are cascaded, a second output terminal of a last cascade DC/AC module functions as the second output terminal of the single phase module.

The second output terminals of the three single phase modules are connected to each other, and the first output terminal of each of the three single phase modules is connected to the filter and is connected to the grid via the filter.

Figure 3:
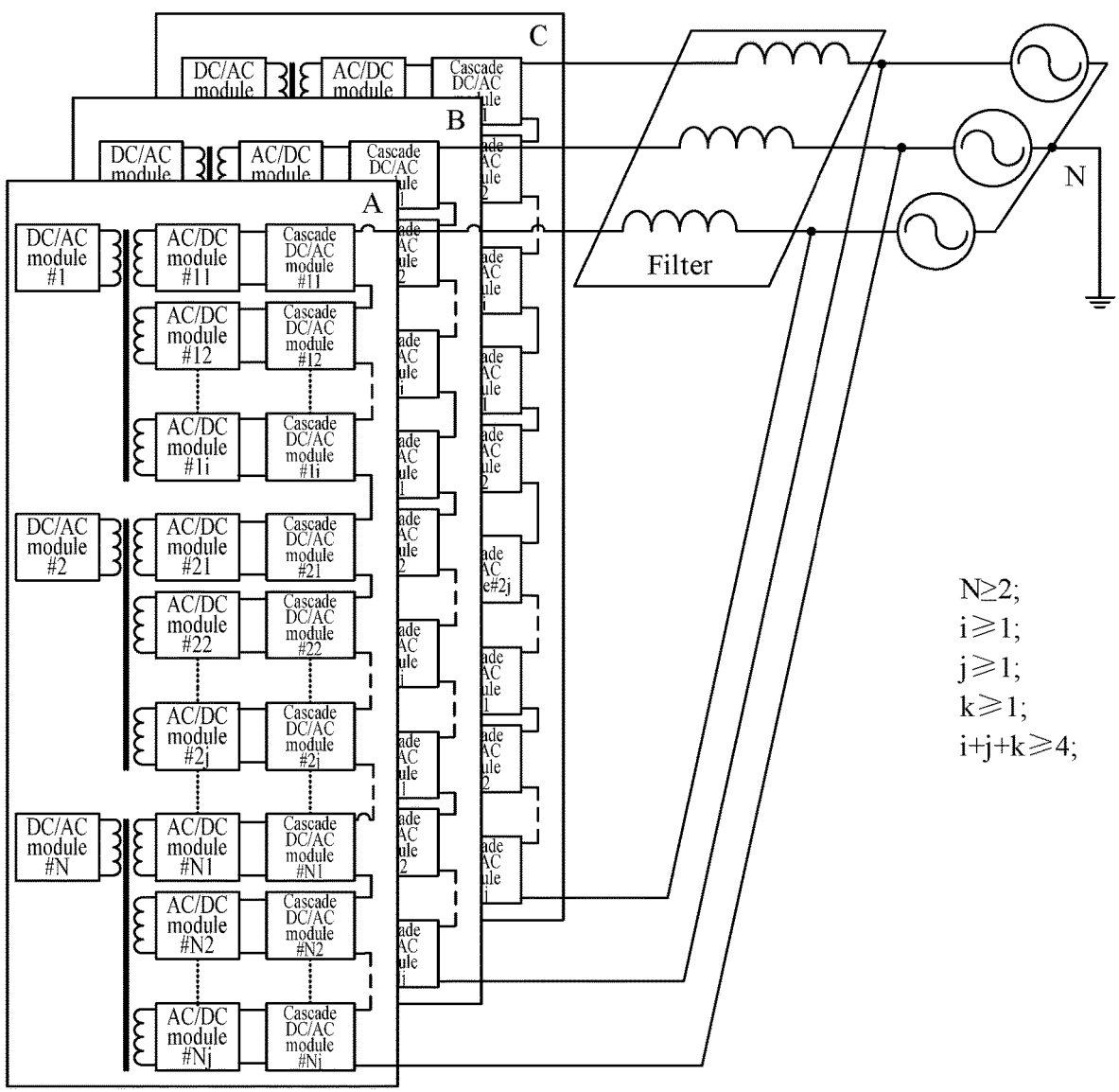
FIG. 3 is a schematic structural diagram of a photovoltaic solid-state transformer according to another embodiment of the present disclosure.
Figure 4A:
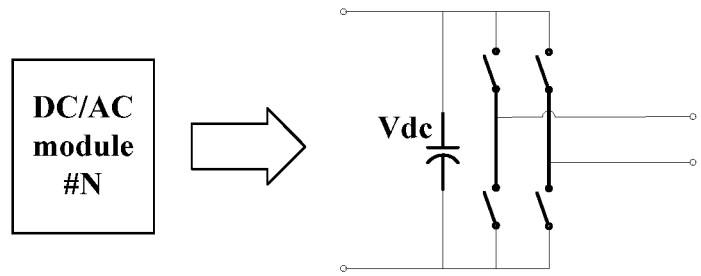
FIG. 4a is a schematic structural diagram of a DC/AC module in a photovoltaic solid-state transformer according to an embodiment of the present disclosure.
Figure 4B:
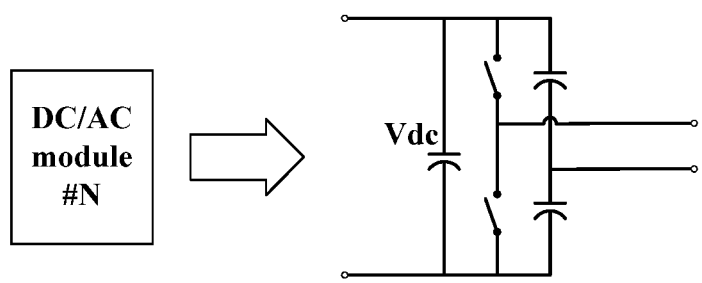
FIG. 4b is a schematic structural diagram of a DC/AC module in a photovoltaic solid-state transformer according to another embodiment of the present disclosure.
Figure 4C:
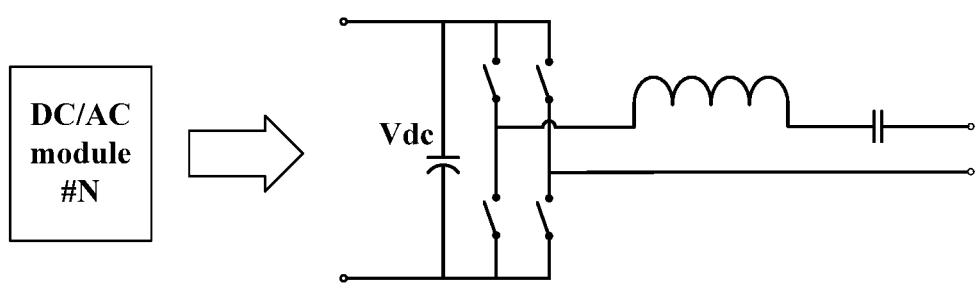
FIG. 4c is a schematic structural diagram of a DC/AC module in a photovoltaic solid-state transformer according to another embodiment of the present disclosure.
Figure 4D:
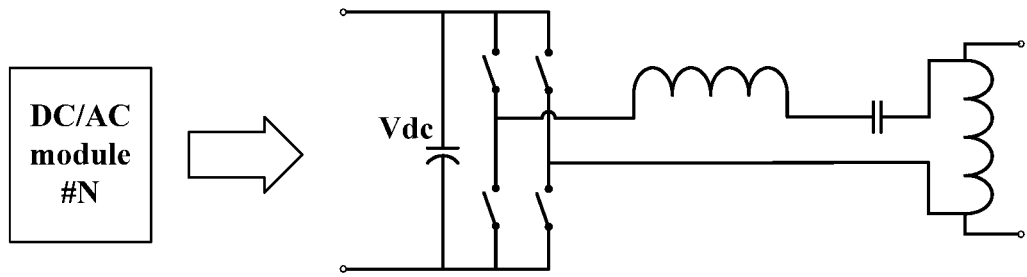
FIG. 4d is a schematic structural diagram of a DC/AC module in a photovoltaic solid-state transformer according to another embodiment of the present disclosure.
Figure 4E:
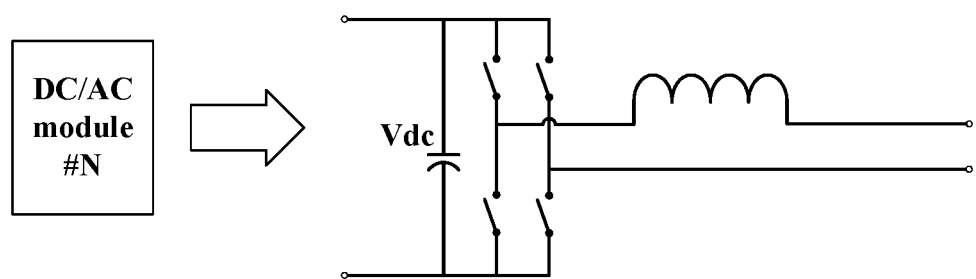
FIG. 4e is a schematic structural diagram of a DC/AC module in a photovoltaic solid-state transformer according to another embodiment of the present disclosure.
Figure 5A:
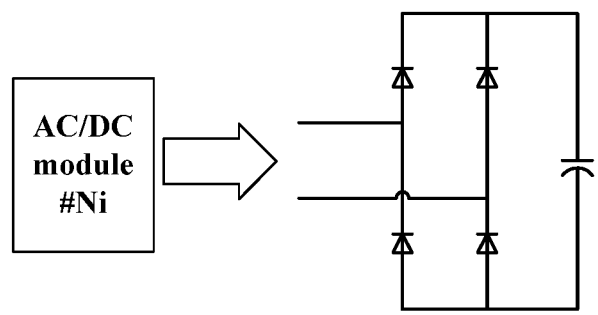
FIG. 5a is a schematic structural diagram of an AC/DC module in a photovoltaic solid-state transformer according to an embodiment of the present disclosure.
Figure 5B:
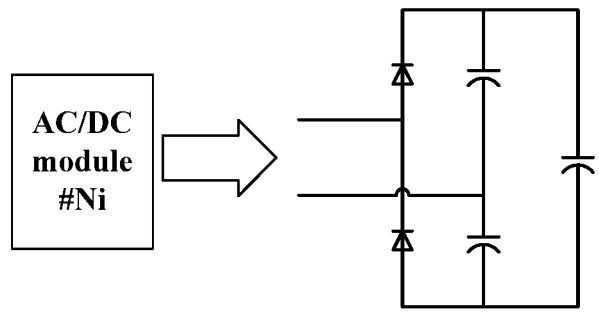
FIG. 5b is a schematic structural diagram of an AC/DC module in a photovoltaic solid-state transformer according to another embodiment of the present disclosure.
Figure 5C:
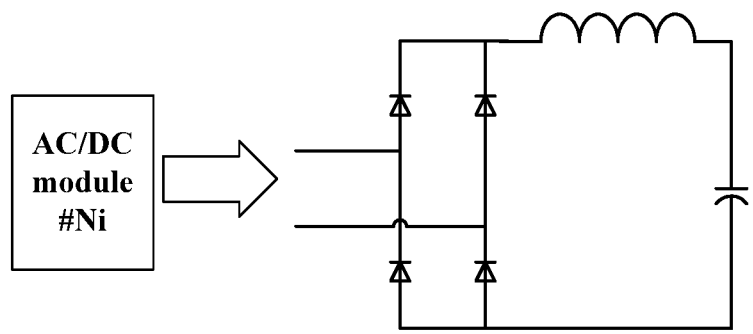
FIG. 5c is a schematic structural diagram of an AC/DC module in a photovoltaic solid-state transformer according to another embodiment of the present disclosure.
Figure 5D:
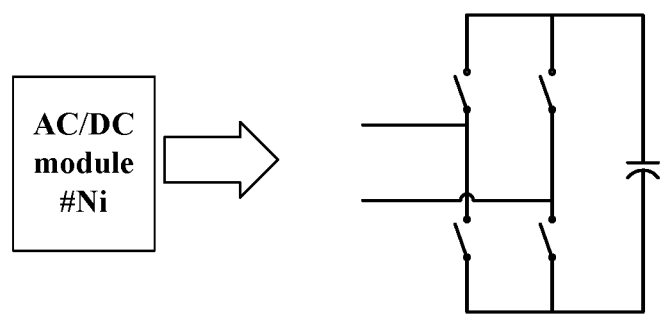
FIG. 5d is a schematic structural diagram of an AC/DC module in a photovoltaic solid-state transformer according to another embodiment of the present disclosure.
Figure 5E:
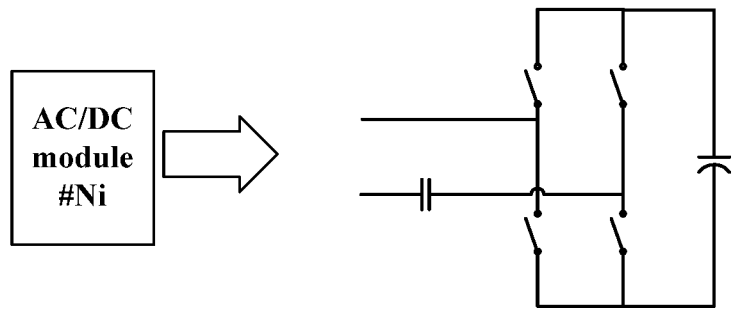
FIG. 5e is a schematic structural diagram of an AC/DC module in a photovoltaic solid-state transformer according to another embodiment of the present disclosure.

In addition, a connection structure of the multiple single phase modules in the photovoltaic solid-state transformer is further provided according to an embodiment, as shown in FIG. 3. It should be noted that the photovoltaic solid-state transformer has the same structure as the embodiment described above. For example, the photovoltaic solid-state transformer includes: multiple single phase modules (shown as A, B, C in FIG. 3) and a filter. Each of the multiple single phase modules includes multiple multiple-output isolated DC/DC converters and multiple cascade DC/AC modules. Each of the multiple-output isolated DC/DC converters includes a DC/AC module, a high frequency transformer and multiple AC/DC modules.

An input terminal of each of the cascade DC/AC modules is connected to an output terminal of at least one of the AC/DC modules. Output terminals of the multiple cascade DC/AC modules are cascaded to form a first output terminal and a second output terminal of the single phase module. The first output terminal of the single phase module is connected to an input terminal of the filter. Second output terminals of multiple single phase modules are connected to each other, or are connected to an output terminal of the filter.

However, the photovoltaic solid-state transformer shown in FIG. 3 differs from the photovoltaic solid-state transformer shown in FIG. 2 in that: the three single phase modules and the filter are connected to the grid in a delta connection. Each of the single phase modules has the first output terminal and the second output terminal. The first output terminal is an output terminal of a first cascade DC/AC module, a second output terminal of the first cascade DC/AC module is connected to a first output terminal of a next cascade DC/AC module. After all the cascade DC/AC modules are cascaded, a second output terminal of a last cascade DC/AC module functions as the second output terminal of the single phase module.

The three single phase modules are connected to the grid via the filter with the first output terminal of each of the three single phase modules being connected to an input terminal of the filter, and the second output terminal of each of the three single phase modules being connected to an output terminal of the filter.

Specifically, in the photovoltaic solid-state transformer provided according to the embodiment of the present disclosure, the DC/DC converters and the cascade DC/AC modules are adopted, where the DC/DC converters provide isolation, and each of the DC/DC converters has the structure of a simple soft switch, with the efficiency being greater than 99%. Compared with a conventional AC/AC power transformer, the efficiency is improved.

In addition, the cascade DC/AC modules with a low switch frequency are cascaded, so that a switch loss is lower than a switch loss of a conventional inverter. In addition, an output current of the cascade DC/AC modules which are cascaded is small so that the switch conduction loss is small, and the efficiency reaches 99.5%. In a case that the DC/DC converters and the cascade DC/AC modules are combined, the overall efficiency is greater than 98.5%, which is higher when compared with the solid-state transformer according to the conventional technology.

A converter having a higher frequency has a smaller volume. Generally, in a conventional inverter solution, a frequency of the isolated transformer is 50-60 Hz, while the frequency of the solid-state transformer provided according to the embodiments of the disclosure is several kilohertz to several tens of kilohertz, thus the volume of the photovoltaic solid-state transformer is reduced.

Based on the embodiments described above, structures of the high frequency transformer and the filter which are preferable in the photovoltaic solid-state transformer are provided according to an embodiment. For example, the high frequency transformer may be a transformer capable of isolating a high or medium voltage. Specifically, the high frequency transformer may be capable of isolating a voltage greater than or equal to 10 KV. The filter may be an L-filter, an LC-filter, an LCL-filter or a high-order filter, which is not limited in the present disclosure.

Specifically, as shown in FIGS. 4a to 4e, in the photovoltaic solid-state transformer provided according to the embodiment, the DC/AC modules may be full-bridge DC/DC converters, half-bridge DC/DC converters, LC resonant DC/DC converters, LLC resonant DC/DC converters and dual-active DC/DC converters, which is not limited in the present disclosure.

In addition, in the photovoltaic solid-state transformer provided according to the embodiment, the AC/DC modules may also be implemented in various manners, as shown in FIGS. 5a to 5e. The AC/DC module may be: a full-bridge rectifying AC/DC module, a full-bridge rectifying and filtering AC/DC module, a dual-active AC/DC module and a C-LLC AC/DC module, which is not limited in the present disclosure.

Figure 6A:
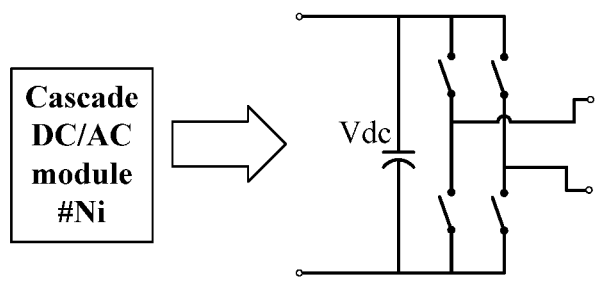
FIG. 6a is a schematic structural diagram of a cascade DC/AC module in a photovoltaic solid-state transformer according to an embodiment of the present disclosure.
Figure 6B:
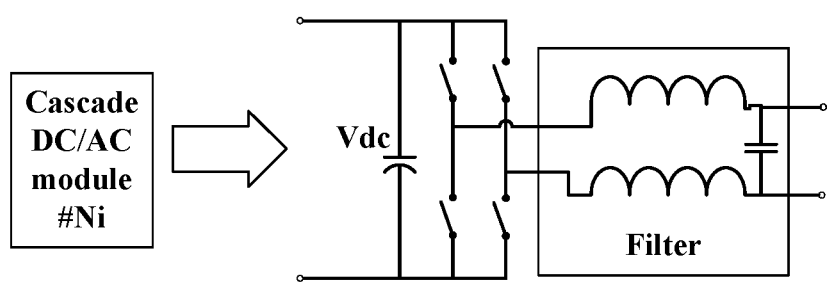
FIG. 6b is a schematic structural diagram of a cascade DC/AC module in a photovoltaic solid-state transformer according to another embodiment of the present disclosure.

Moreover, in the photovoltaic solid-state transformer provided according to the embodiment, as shown in FIGS. 6a to 6b, the cascade DC/AC modules may also be H-bridge DC/AC modules or cascade DC/AC modules connected with a filter, which is not limited in the present disclosure.

Based on the embodiments described above, the photovoltaic solid-state transformer provided according to an embodiment may further include: a controller, a communication module and a power supply.

The controller is connected to the cascade DC/AC modules and configured to control the cascade DC/AC modules to cascade signals outputted by the cascade DC/AC modules.

The communication module is connected to the controller and configured to transmit an output signal of the controller to a preset background server.

The power supply is connected to the controller and configured to supply power to the photovoltaic solid-state transformer.

In addition, the photovoltaic solid-state transformer may further include: a detection module configured to detect a voltage, a current and a temperature. The controller may be a Central Processing Unit (CPU), a Microprogrammed Control Unit (MCU), a Digital Signal Processor (DSP), an Advanced RISC Machines (ARM), a Field Programmable Gate Array (FPGA), a Complex Programmable Logic Device (CPLD), an Application Specific Integrated Circuit (ASIC) and the like.

In addition, in the photovoltaic solid-state transformer provided according to an embodiment, cascade DC/AC modules or DC/DC converters provided with a controller may be adopted. For example, the cascade DC/AC modules is provided with at least one controller, a communication module, a function module for detecting a voltage, a current or a temperature, an auxiliary power supply, etc., where physical implementation of the controller includes but is not limited to CPU, MCU, DSP, ARM, FPGA, CPLD, ASIC chip, etc. The controller of the cascade DC/AC modules controls the cascade DC/AC modules. The communication module implements communication between the above controller and the controller of the photovoltaic solid-state transformer. The function module for detecting a voltage, a current or a temperature detects an input voltage, an input current and a temperature of each of the cascade DC/AC modules.

As another example, the high-voltage isolated DC/DC converter includes at least one controller, a communication function module, a function module for detecting a voltage, a current or a temperature, an auxiliary power supply, etc., where physical implementation of the controller includes but is not limited to CPU, MCU, DSP, ARM, FPGA, CPLD, an ASIC chip, etc. The controller functions to control the DC/AC module connected to the controller and communicate with the controller of the photovoltaic solid-state transformer for reporting an obtained operation state of the high-voltage isolated DC/DC converter.

In addition, in the photovoltaic solid-state transformer provided according to an embodiment, input terminals of a part of the DC/AC modules in the multiple-output isolated DC/DC converter are connected to an external battery or an external photovoltaic module.

It should be noted that in an embodiment, the photovoltaic solid-state transformer may further include: a MPPT (maximum power point tracking) module connected to an input terminal of the photovoltaic solid-state transformer for performing maximum power point tracking. As can be seen, that the photovoltaic solid-state transformer provided according to the embodiments may include the MPPT module or may not include the MPPT module.

Figure 7:
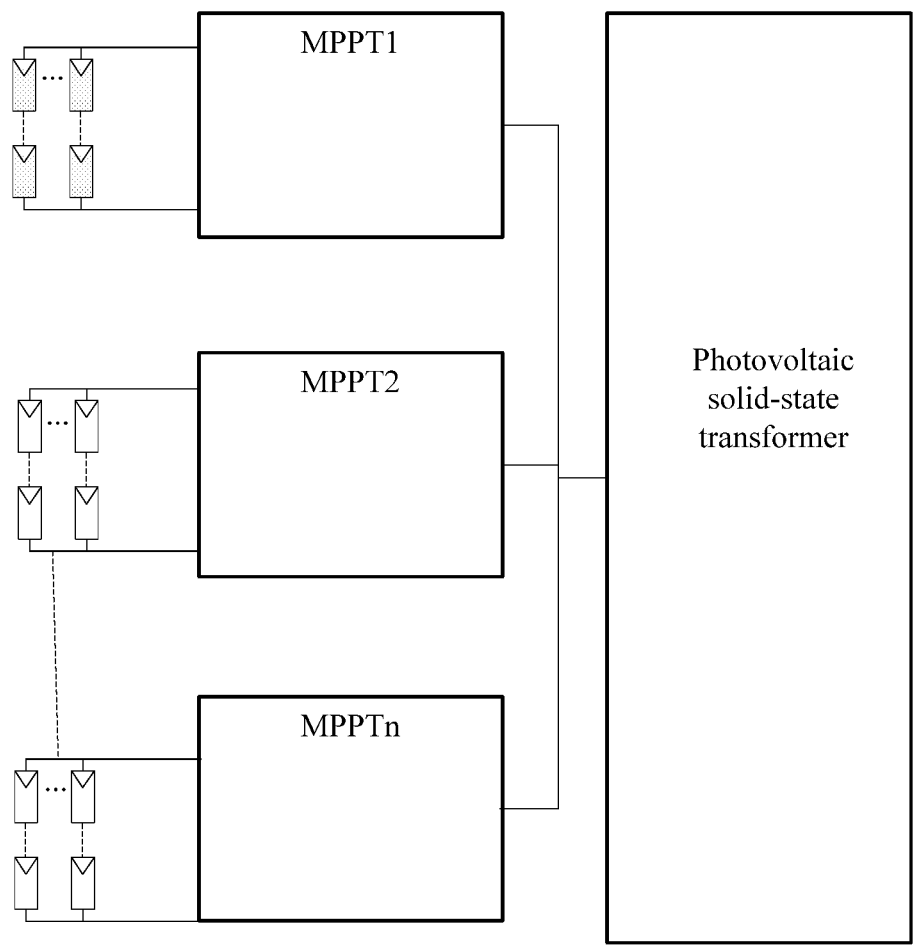
FIG. 7 is a schematic structural diagram of a photovoltaic inverter system according to an embodiment of the present disclosure.

Based on the embodiments described above, reference is made to FIG. 7, which is a schematic structural diagram of a photovoltaic inverter system according to an embodiment. The photovoltaic inverter system includes: the photovoltaic solid-state transformer according to any one of the embodiments described above and at least one branch including a photovoltaic string and a MPPT module connected in series.

The photovoltaic string includes multiple photovoltaic assemblies. A direct current input terminal of the photovoltaic solid-state transformer is connected to at least two MPPT modules connected in parallel with each other.

An operation principle of the photovoltaic solid-state transformer system is the same as an operation principle of the photovoltaic solid-state transformer described above. Moreover, in the embodiment, all or some of the MPPT modules may be connected in parallel with each other, to form a branch connected to the input terminal of the photovoltaic solid-state transformer.

It should be noted that in a case that the photovoltaic inverter system includes the MPPT modules, the transformer without a MPPT function is preferred to be selected as the photovoltaic solid-state transformer. Apparently, the photovoltaic solid-state transformer may also be a transformer with the MPPT function.

In addition, in the embodiment, the multiple-output isolated DC/DC converters and cascade DC/AC modules of the single phase module may be bidirectional devices. Specifically, a bidirectional high-voltage converter is provided according to the embodiment, which includes: multiple single phase modules and a filter. Each of the single phase modules includes multiple multiple-port bidirectional isolated DC/DC converters and multiple cascade bidirectional DC/AC modules.

Each of the multiple-port bidirectional isolated DC/DC converters includes a bidirectional DC/AC converter, a high frequency transformer and bidirectional AC/DC modules.

A direct current terminal of each of the cascade bidirectional DC/AC modules is connected to a direct current terminal of at least one of the bidirectional AC/DC modules.

Alternative current terminals of the multiple cascade bidirectional DC/AC modules are cascaded, to form a first alternative current terminal and a second alternative current terminal of the single phase module.

The first alternative current terminal of the single module is connected to a terminal of the filter. Second alternative current terminals of multiple single phase modules are connected to each other, or are connected to another terminal of the filter.

The operation principle may be seen in the embodiments described above, which is not repeated.

In view of above, a photovoltaic solid-state transformer is provided, which includes: multiple single phase modules and a filter. Each of the single phase modules includes multiple multiple-output isolated DC/DC converters and multiple cascade DC/AC modules, where each of the multiple-output isolated DC/DC converters includes a DC/AC module, a high frequency transformer and multiple AC/DC modules, an input terminal of each of the cascade DC/AC modules is connected to an output terminal of at least one of the AC/DC modules, and output terminals of the multiple cascade DC/AC modules are cascaded, to form a first output terminal and a second output terminal of the single phase module. The first output terminal of each of the single phase modules is connected to an input terminal of the filter, and second output terminals of the single phase modules are connected to each other, or are connected to an output terminal of the filter. As can be seen, in the photovoltaic solid-state transformer provided according to the embodiments of the present disclosure, the DC/DC converters and the cascade DC/AC modules are adopted, both of which are simple logical switches such that the volume of the photovoltaic solid-state transformer is reduced. In addition, since the efficiency of the DC/DC converter is higher than 99%, the efficiency of the cascade DC/AC module is higher than 99.5%, the photovoltaic solid-state transformer has an improved overall efficiency higher than 98.5%.

The embodiments in this specification are described in a progressive way, each of which emphasizes the differences from others, and the same or similar parts among the embodiments can be referred to each other. Since the device disclosed in the embodiments corresponds to the method therein, the description thereof is relatively simple, and for relevant matters references may be made to the description of the method.

It may be known by those skilled in the art that, units and steps in each method described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on application of the technical solution and design constraint condition. Those skilled in the art can use different method for each application to realize the described function, and this is not considered to be beyond the scope of the application.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the technical field.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A photovoltaic solid-state transformer, comprising:
a plurality of single phase modules and a filter, wherein
each of the single phase modules comprising a plurality of multiple-output isolated DC/DC converters and a plurality of cascade DC/AC modules, wherein
each of the multiple-output isolated DC/DC converters comprises a DC/AC module, a high frequency transformer and a plurality of AC/DC modules,
an input terminal of each of the cascade DC/AC modules is connected to an output terminal of at least one of the AC/DC modules, and
output terminals of the plurality of cascade DC/AC modules are cascaded, to form a first output terminal and a second output terminal of the single phase module, wherein the plurality of multiple-output isolated DC/DC converters in each of the single phase modules have different DC/AC modules and different high frequency transformers from each other and wherein
the first output terminal of each of the single phase modules is connected to an input terminal of the filter, and second output terminals of the single phase modules are connected to each other, or are connected to an output terminal of the filter.

2. The photovoltaic solid-state transformer according to claim 1, wherein the high frequency transformer is configured to isolate a voltage greater or equal to 10 KV.

3. The photovoltaic solid-state transformer according to claim 1, wherein the filter is one of: an L-filter, an LC-filter, an LCL-filter and a high-order filter.

4. The photovoltaic solid-state transformer according to claim 1, wherein the DC/AC module is one of: a full-bridge DC/AC converter, a half-bridge DC/AC converter, an LC resonant DC/AC converter, an LLC resonant DC/AC converter and a dual-active DC/AC converter.

5. The photovoltaic solid-state transformer according to claim 1, wherein each of the AC/DC modules is one of: a full-bridge rectifying AC/DC module, a full bridge rectifying and filtering AC/DC module, a dual-active AC/DC module and a C-LLC AC/DC module.

6. The photovoltaic solid-state transformer according to claim 1, wherein each of the cascade DC/AC modules is one of: an H-bridge DC/AC module and a cascade DC/AC module connected with a filter.

7. The photovoltaic solid-state transformer according to claim 1, further comprising:
a controller, connected to the cascade DC/AC modules and configured to control the cascade DC/AC modules to cascade signals outputted by the cascade DC/AC modules;
a communication module, connected to the controller and configured to transmit an output signal of the controller to a preset background server; and
a power supply, connected to the controller and configured to supply power to the photovoltaic solid-state transformer.

8. The photovoltaic solid-state transformer according to claim 1, wherein input terminals of a part of the DC/AC modules in the multiple-output isolated DC/DC converters are connected to an external battery or an external photovoltaic module.

9. The photovoltaic solid-state transformer according to claim 1, further comprising: an MPPT (maximum power point tracking) module connected to an input terminal of the photovoltaic solid-state transformer.

10. A photovoltaic inverter system, comprising: the photovoltaic solid-state transformer according to claim 1 and at least one branch comprising a photovoltaic string and an MPPT (maximum power point tracking) module connected in series, wherein the photovoltaic string comprises a plurality of photovoltaic modules, and a direct current input terminal of the photovoltaic solid-state transformer is connected to at least two MPPT modules connected in parallel.

11. A bidirectional high-voltage converter, comprising:
a plurality of single phase modules and a filter, wherein
each of the single phase modules comprises a plurality of multiple-port bidirectional isolated DC/DC converters and a plurality of cascade bidirectional DC/AC modules, wherein
each of the multiple-port bidirectional isolated DC/DC converters comprises a bidirectional DC/AC module, a high frequency transformer and bidirectional AC/DC modules,
a direct current terminal of each of the cascade bidirectional DC/AC modules is connected to a direct current terminal of at least one of the bidirectional AC/DC modules, and
alternative current terminals of the cascade bidirectional DC/AC modules are cascaded, to form a first alternative current terminal and a second alternative current terminal of the single phase module, wherein the plurality of multiple-port bidirectional isolated DC/DC converters in each of the single phase modules have different bidirectional DC/AC modules and different high frequency transformers from each other, and wherein
the first alternative current terminal of each of single phase modules is connected to one terminal of the filter, and second alternative current terminals of the single phase modules are connected to each other, or are connected to another terminal of the filter.

* * * * *